(12) United States Patent
Lopez

(10) Patent No.: US 6,658,188 B2
(45) Date of Patent: Dec. 2, 2003

(54) DRY OPTICAL FIBER CABLE FOR TELECOMMUNICATIONS

(75) Inventor: Ruben Mandujano Lopez, Queretaro (MX)

(73) Assignee: Condumex, Mexico City (MX)

( * ) Notice: Subject to any disclaimer, the term of this patent is extended or adjusted under 35 U.S.C. 154(b) by 0 days.

(21) Appl. No.: 10/022,994

(22) Filed: Dec. 18, 2001

(65) Prior Publication Data

US 2003/0044137 A1 Mar. 6, 2003

(30) Foreign Application Priority Data

Sep. 6, 2001 (MX) ........................................ 01009019

(51) Int. Cl.$^7$ ................................................ G02B 6/44
(52) U.S. Cl. ........................ 385/113; 385/109; 385/103; 385/112
(58) Field of Search .................. 385/100–114

(56) References Cited

U.S. PATENT DOCUMENTS

| 4,909,592 A | * | 3/1990 | Arroyo et al. | ............... 385/113 |
| 5,082,719 A | * | 1/1992 | Arroyo | ................... 385/102 X |
| 5,999,677 A | * | 12/1999 | Moncisvais et al. | ........ 385/113 |

* cited by examiner

*Primary Examiner*—Phan T. H. Palmer
(74) *Attorney, Agent, or Firm*—Jonathan Grant; Grant Patent Services

(57) ABSTRACT

A dry optical fiber cable, for voice, video and data telecommunication based on a plurality of a loosely fitted tubes placed longitudinally and surrounding a central reinforcement element, said tubes accommodating at least one or several optical fiber filaments. This dry optical fiber cable is characterized because in the internal area, between the central reinforcement element and the plurality of tubes, it has a first dry protection layer; the interior assembly is then externally protected by a second dry protection. It then has a polyethylene cover followed by the third dry protection and finally a polyethylene cover.

4 Claims, 1 Drawing Sheet

DRY OPTICAL FIBER CABLE FOR TELECOMMUNICATIONS

BACKGROUND OF THE INVENTION

1. Field of the Invention

Figure 1:
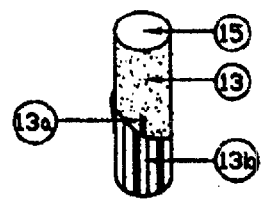
Figure 1:
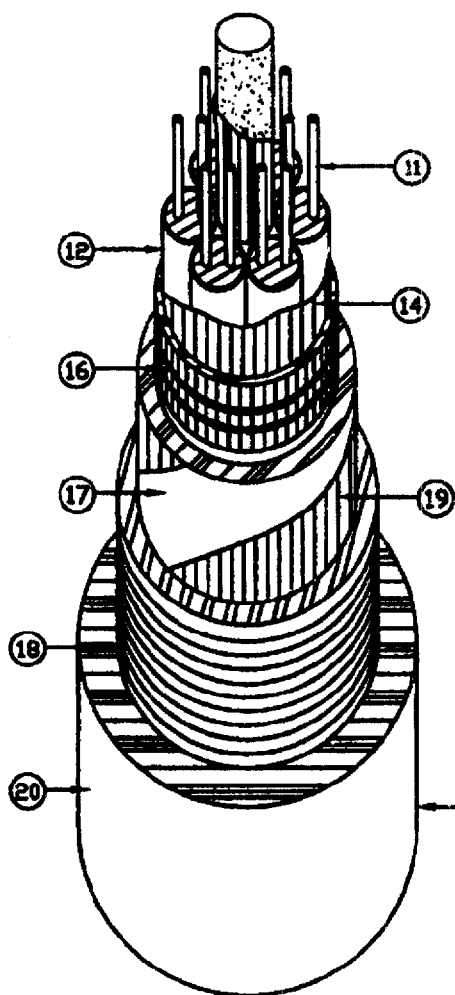

The construction of the cable consists in applying swellable threads and/or powders around the dielectric central reinforcement. Afterwards, the tubes containing the optical fiber are laid around the above mentioned central reinforcement, followed by the application of swellable tapes enveloping the assembly forming in this way the core of the cable. Then, swellable aramide fiber or swellable fiber glass, a first plastic cover, a metal armature, or the final cover can be laid, inserting always between each additional element a swellable tape. This tape will contribute to prevent humidity penetration between the various layers protecting the core of the cable depending on the use, either aerial or underground.

2. Description of the Prior Art

Currently, various cables are known on the international market that meet the growing demand for communication of speech, video and data. These cables have revolutionized telecommunications offering services that facilitate the development of intercommunications because of their high quality, high conduction capacity and high transmission speed.

Among these various cables, the ones used in what is known as outside or exterior plant, because they are exposed to weathering, have to be manufactured to withstand different environment conditions, such as temperature changes and humidity.

To avoid the penetration of humidity, several compounds are typically known that are in the form of jellies that are used both inside and outside the tubes containing the optical fiber (loosely fitting tubes). These compounds are presented in U.S. Pat. No. 5,999,677 which discloses an improved optical fiber cable in which the importance of protecting the optical fiber against humidity is discussed.

The use of said jellies causes some inconveniences which are evident in design, process and installation limitations of optical fiber cables for outside use. With regard to design, they limit the types of materials that can be used for the manufacturing of the tube as well as the other components of the cable since they must be chemically compatible to avoid degradation and consequent damage to the optical fibers. With regard to the manufacturing process, special equipment is required to impregnate the cable with jelly and to control its application which is time consuming, dirty and complicated. With regard to cable installation, to perform terminal connections or splicing, the ends of the cable have to be prepared, cleaning each one of the components until the jelly is eliminated and connections can be made. This implies the use of solvents for cleaning purposes, but said materials degrade the tube containing the optical fiber cable or the protecting covers of the cable. On the other hand, because this operation is time consuming and dirty, it can cause slight skin and airway irritations to the people installing the cables if they do not wear adequate protections and take appropriate precautions.

One of the main characteristics that the optical fiber cable have to fulfill, in the case of installations known as external or exterior plant cables, is that the fibers be duly protected against possible contact with humidity. This contact causes the formation of hydrogen, which attacks the fibers, affecting their performance and life. For this reason, the cables must be manufactured in such a way that their integrity is ensured (if they are properly made during the manufacturing process itself). During the installation process and in operation, humidity penetration inside the cable must be prevented; otherwise, hydrogen would form and optical fibers would be damaged.

For this reason, two types of protection are known. The most commonly used consists of protecting the fibers inside and the tube outside containing them and between the different armatures and covers that constitute the cable with a jelly forming an impenetrable barrer to humidity. The second type of protection makes use of tapes and powders absorbing humidity to offer the same protective effect for the fibers.

In U.S. Pat. No. 5,082,719, a communication cable is described, the characteristic of which is that it prevents water from penetrating inside the cable by means of a tape impregnated with superabsorbent material placed between the core and the jacket and enveloping the core longitudinally. Upon contact with water, the superabsorbent material swells and impedes water penetration.

In U.S. Pat. No. 4,909,592, a communication cable is described which presents elements to block water penetration in the core located in a tube and a cover system. Said elements can be tapes or threads or both, with superabsorbent materials.

DESCRIPTION OF THE INVENTION

Hereinafter the invention is described according to the drawings of FIGS. 1, 1*a* and 2 wherein:

FIG. 1 is a perspective view with cross sections of the dry optical fiber cable.

FIG. 1*a* is a cross section view of the central reinforcement of the cable of FIG. 1.

Figure 2:
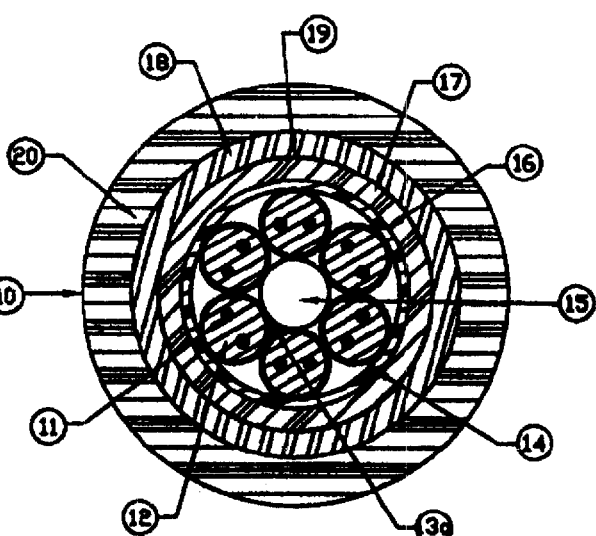

FIG. 2 is a cross section view of the cable sections of FIG. 1.

The invention includes a dry optical fiber cable for telecommunication containing more than one optical fiber filament, used for the transmission of coded light that translates in voice, video or data communications between two points called transmitter and receiver.

The optical fiber cable 10, FIGS. 1 and 2, includes a plurality of loosely fitted tubes 12 placed longitudinally and surrounding a dielectric central reinforcement element 15. Within the tubes, the optical fiber filaments 11 are inserted loosely. Said cable is characterized because between the central reinforcement and the loosely fitted tubes, a first dry protection against humidity is laid (FIG. 1*a*) (depending to use given to the cable and the freedom permitted by the particular design). Said first dry protection is based on dispersed powder 13, helicoidal threads 13*b*, or swellable tape 13*a*, laid either helicoidally or longitudinally, in both cases with overlapping of at least 3 mm, instead of the traditional jelly filling.

Around the assembly formed in this way, a second dry protection against humidity is laid (forming thus the cable core). In this case a swellable tape or thread is used, depending on the following layer, i.e. a polyethylene cover 17, or an aramide fiber, in which case it has to be swellable aramide fiber, or swellable fiber glass 16. This is followed by a first or second polyethylene cover 17. The assembly formed in this way can include one or two metallic tapes 18 inserting between the core of the cable and the metallic tape a third dry protection based on swellable tape 19, and finally covered with polyethylene 20.

The choice to use the dry protection against humidity in the form of a powder, thread or tape will depend on the specific design. In the case of swellable powder and swellable thread there is only one method of application. However, in the case of swellable tape, the tape can be laid either longitudinally or helicoidally, depending on the diameter of the cable core to protect against humidity penetration. Care must be taken to maintain a minimum 3 mm overlap. This overlap will be increased proportionally according to the diameter of the core to be protected, in order to ensure the efficacy of the covering.

The improvements to the cable herein described are characterized because they include special covers such as powder, thread, aramide fiber, or fiber glass and tapes, all of them swellable. This means that, in all the cases, they possess the special capacity to expand in the presence of humidity, preventing thus its penetration. The process required for the application of each and every one of these materials is considered unique and exclusive for a given design. This is because, in each particular case, conditions have to be established to ensure the uniformity of its application, in order to ensure the efficacy of the dry protection and finally to ensure that the product is reliable with regard to its life. The products must also offer not only the advantages of design versatility, ease and control of manufacturing process, but also ease, speed and cleanliness in the installation process. These characteristics are extremely attractive for manufacturers and fitters, since these improvements are transparent to the final user.

The application of powder is conducted through a talc spreader equipment offering regular application and safety for the operator, since the inhalation of said powder could provoke obstructions in the airways.

Although it is a simple process, thread laying has to be made with a thread unwinding device maintaining some tension to avoid the rupture of the thread or its snarling, which would damage or cause deteriorate the cable performance. The laying will be helicoidal in opposite senses when two threads are used at the same time and a determined cabling pitch will have to be maintained, depending on the diameter on which they are laid and on the protective material.

The laying of the tapes requires a tape unwinding device controlling the tension to prevent rupture and undulation. In the case of longitudinal laying, the former is needed to wrap the tape around the core. In the case of helicoidal tape, a double unwinding device is needed to ensure the overlapping during the laying of the tape and consequently, the adequate protection against humidity.

Particular specifications have been created for each one of these materials in such a way that it can be ensured that they will perform as expected.

EXAMPLE

Construction of the Cable

The optical fiber is immersed in a jelly-type filling material within a plastic tube placed in such a way that its length exceeds in 2 per thousand the length of the tube containing it. Then the tubes are alternately laid around a dielectric central reinforcement in a right sense and then in a left sense forming what is known as a SZ lay. The lay pitches are variable according to the requirements of the particular user. With regard to the tape pitch, when the swellable tape is laid helicoidally, the pitch must be such as to ensure at least 40% overlapping. In the case of longitudinal laying, the overlapping should be at least 5 mm. Among the general characteristics of the performance of the cable, the operating temperature ranges from −40° C. to +65° C. The operating voltage depends on the needs of the client, whether it is an underground or aerial application. It also depends on the spans or lengths to be installed. The swellability percentage reached by the swellable tape will depend on the space permitted by the cable structure to impede humidity penetration (up to 300%). The typical characteristic evaluated is water penetration, which consists of a one-meter long cable sample having to support the pressure of a one-meter high water column during at least one hour without showing the flow of the least water drop at the opposite end of the test cable. With regard to the life of the cable, the tests conducted indicate that under controlled conditions at 20° C., the cable lasts for 70 years; on the other hand, at 40° C., it lasts only for 12 years. It can thus be determined that the life in normal operating conditions can exceed 25 years.

Other characteristics of the swellable tape are:

Tensile strength over 35 N/cm

Elongation over 11%

Thermal stability, short duration 230° C.

Thermal stability, long duration 90° C.

Other characteristics such as: weight, thickness and absorption capacity depend on the needs of the design.

The advantages offered by this product are apparent from the handling, storage, control and preservation of the tape, its ease and control of application. This permits the reduction of the operation times as well as an ease cable installation, which is shown in the preparation of the ends for splicing purposes. All these advantages imply economic benefits compared to the traditional cable with jelly filling.

While this invention has been described with respect to particular embodiments thereof, it is apparent that numerous other forms and modifications of this invention will be obvious to the skilled in the art. The appended claims and this invention generally should be construed to cover all such obvious forms and modifications which are within the scope of the present invention.

What is claimed is:

1. A dry optical fiber telecommunications cable for voice, video and data telecommunications, comprising:

a) a central reinforcement element;

b) at least one optical fiber filament;

c) a plurality of tubes loosely fitted longitudinally and surrounding said central reinforcement element, wherein said at least one said optical fiber filament can be fitted through each of said tubes;

d) a first dry protection layer between said central reinforcement element and said plurality of tubes, wherein said first dry protection layer is selected from the group consisting of dispersed powder, helicoidal threads, and swellable tape;

e) a second dry protection layer surrounding said plurality of tubes, wherein said second dry protection layer is selected from the group consisting of a polyethylene cover and an aramide fiber;

f) a polyethene cover positioned over and around said second dry protection layer;

g) a third dry protection layer comprised of swellable tape;

h) at least one metallic tape surrounding said third dry protection layer; and i) a covering of polyethylene surrounding said at least one metallic tape surrouding said third dry protection layer.

2. The dry optical fiber telecommunications cable according to claim 1, wherein said first dry protection layer is a swellable dispersed powder.

3. The dry optical fiber telecommunications cable according to claim 1, wherein said first dry protection layer is a swellable tape laid helically laid with an overlap of 3 mm.

4. The dry optical fiber telecommunications cable according to claim 1, wherein said first dry protection layer is a swellable tape laid longitudinally with an overlap of 3 mm.

* * * * *